No. 667,814. Patented Feb. 12, 1901.
G. G. WYLAND.
METAL FASTENING DEVICE.
(Application filed Nov. 19, 1900.)
(No Model.)
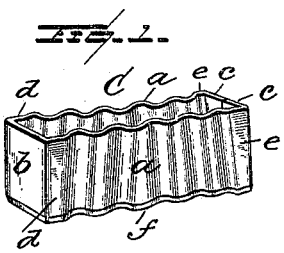
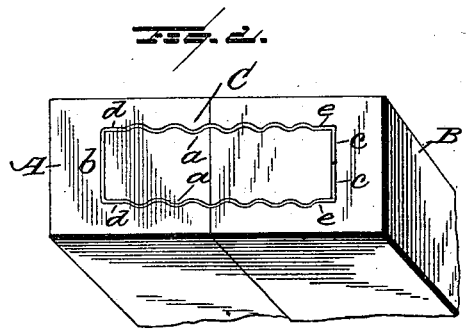
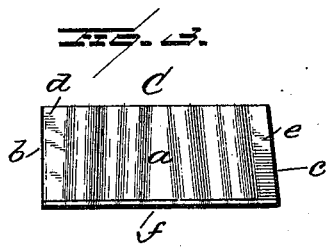
WITNESSES:
L. C. Hills.
M. G. Mooney.
INVENTOR
George Gilbert Wyland.
BY Chas. H. Fowler
Attorney

UNITED STATES PATENT OFFICE.

GEORGE GILBERT WYLAND, OF WILLIAMSPORT, PENNSYLVANIA.

METAL FASTENING DEVICE.

SPECIFICATION forming part of Letters Patent No. 667,814, dated February 12, 1901.

Application filed November 19, 1900. Serial No. 37,016. (No model.)

*To all whom it may concern:*

Be it known that I, GEORGE GILBERT WYLAND, a citizen of the United States, residing at Williamsport, in the county of Lycoming and State of Pennsylvania, have invented certain new and useful Improvements in Metal Fastening Devices; and I do hereby declare that the following is a full, clear, and exact description of the same, reference being had to the annexed drawings, making a part of this specification, and to the letters of reference marked thereon.

The present invention has relation to that class of metal fastening devices constructed from a strip of sheet metal and bent into shape and employed for securing wood-joints together, and is designed as an improvement upon my former patent, dated December 7, 1897, and numbered 595,000.

It is the object of the invention to materially improve the holding qualities of the fastening device after being driven into the wood and also increase its strength and durability, as will be hereinafter described and claimed.

Figure 1 of the drawings is a perspective view of a fastening device constructed in accordance with my invention; Fig. 2, a view showing a wood-joint with the fastening device applied thereto; Fig. 3, a side elevation of the fastening device.

In the accompanying drawings, A B represent the two pieces which together comprise a wood-joint secured by my improved fastening device, (indicated at C.) This device is constructed from a rectangular piece of sheet metal and by machinery especially adapted for the purpose is bent into shape, as indicated in the drawings.

The fastening device has corrugated sides $a$, which corrugations are disposed on an incline from a perpendicular to form a series of wedges to draw the joint together when driven in the wood. The heel $b$ of the fastening device is straight, as in my former patent, and thereby when bent into shape is prevented from springing out laterally, as would be the case when formed rounded. The flanges $c$ at the front end of the fastening device extend inwardly in contradistinction to outwardly, as in my former patent, and are perfectly straight, with a sharp bend from the juncture with the corrugated sides of the device.

One of the essential features of the invention is to form the flanges $c$ of sufficient length so that when said flanges are bent inwardly at right angles to the corrugated sides their extremities or edges will come close together, and thereby form a closed link and a closed loop-shaped fastening device. This feature of the invention is considered of material importance from the fact that by the sharp bend at the juncture between the corrugated sides and the flanges and by forming the same perfectly straight and extending them inwardly in contact with each other the fastening device is rendered much stronger and the sides thereof are more securely held from spreading when entering the wood. It will be noticed that the extremities of the corrugated sides at both the heel and front end have straight extensions $d$ $e$, respectively, and that the angle formed by the juncture between the heel and the extensions $d$ and the flanges $c$ and extensions $e$ is perfectly straight and presents a sharp cutting corner to enter and enables the device to be more easily driven into the wood. If desired, the fastening device may be provided with a sharp driving edge, as indicated at $f$, to facilitate the device being driven in the wood.

Having now fully described my invention, what I claim as new, and desire to secure by Letters Patent, is—

1. A closed loop-shaped sheet-metal fastening device having corrugated sides and inwardly-extending flanges at its front end, said flanges being straight and of sufficient length to come together to form a closed end, substantially as and for the purpose set forth.

2. A closed loop-shaped sheet-metal fastening device having corrugated sides, the corrugations extending at an incline to a perpendicular, and inwardly-extending flanges which come together to form a closed end, substantially as and for the purpose described.

3. A closed loop-shaped sheet-metal fastening device having corrugated sides, a straight heel with straight extensions joining the heel with the corrugated sides, inwardly-extending flanges at the front end of the device, and straight extensions joining the flanges with the corrugated sides, substantially as and for the purpose specified.

4. A closed loop-shaped sheet-metal fastening device having corrugated sides, a straight heel, inwardly-extending flanges at its front end of sufficient length to come together to form a closed front end, and straight extensions joining the corrugated sides with the heel and the flanges, substantially as and for the purpose set forth.

In testimony that I claim the above I have hereunto subscribed my name in the presence of two witnesses.

GEORGE GILBERT WYLAND.

Witnesses:
JOHN I. KANE,
J. M. RIELLY.